US010063502B2

(12) United States Patent
Huo

(10) Patent No.: US 10,063,502 B2
(45) Date of Patent: *Aug. 28, 2018

(54) GENERATION OF A COMMUNICATION REQUEST BASED ON VISUAL SELECTION

(71) Applicant: EMPIRE TECHNOLOGY DEVELOPMENT LLC, Wilmington, DE (US)

(72) Inventor: Ju Huo, Hedong District (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/429,881

(22) Filed: Feb. 10, 2017

(65) Prior Publication Data
US 2017/0155606 A1 Jun. 1, 2017

Related U.S. Application Data

(63) Continuation of application No. 14/387,081, filed as application No. PCT/CN2013/087105 on Nov. 14, 2013, now Pat. No. 9,590,933.

(51) Int. Cl.
*G06F 15/16* (2006.01)
*H04L 12/58* (2006.01)
(Continued)

(52) U.S. Cl.
CPC ............ *H04L 51/10* (2013.01); *G06F 3/1462* (2013.01); *G06K 9/2081* (2013.01);
(Continued)

(58) Field of Classification Search
CPC ... G06F 3/04842; G06F 3/1462; G06Q 10/10; H04L 51/10; H04L 51/32; H04L 65/1069; H04L 67/306
See application file for complete search history.

(56) References Cited

U.S. PATENT DOCUMENTS 6,356,283 B1* 3/2002 Guedalia .................. G06F 3/14
715/760
8,073,203 B2* 12/2011 Tang ...................... H04N 7/147
345/633
(Continued)

FOREIGN PATENT DOCUMENTS

CN 102637183 A 8/2012
CN 102821058 A 12/2012

OTHER PUBLICATIONS

"Lily of the network," accessed at https://web.archive.org/web/20130714225827/http://shouji.baihe.com/, accessed on Feb. 10, 2017, pp. 3.
(Continued)

*Primary Examiner* — Zarni Maung

(57) ABSTRACT

Technologies are generally described for generating a communication request. An example method may include retrieving an image from a memory. The method may also include sending the image to a first device operated by a first user and a second device operated by a second user. The method may also include receiving a first indication of a first selection region from the first device. The method may also include receiving a second indication of a second selection region from the second device. The method may also include analyzing the first and second selection regions. The method may also include selecting the first and second user based on the analysis. The method may also include generating the communication request to request communication between the first user and the second user. The method may also include sending the communication request to at least one of the first device or the second device.

20 Claims, 6 Drawing Sheets

(51) Int. Cl.
*H04L 29/06* (2006.01)
*H04L 29/08* (2006.01)
*G06K 9/20* (2006.01)
*G06F 3/14* (2006.01)
*G06K 9/62* (2006.01)
*G06F 12/00* (2006.01)

(52) U.S. Cl.
CPC ............ *G06K 9/6202* (2013.01); *H04L 51/32* (2013.01); *H04L 65/1069* (2013.01); *H04L 67/306* (2013.01); *G06K 2009/6213* (2013.01)

(56) References Cited

U.S. PATENT DOCUMENTS

| | | | |
|---|---|---|---|
| 8,688,782 | B1 | 4/2014 | Lin et al. |
| 8,774,487 | B2 | 7/2014 | Levine et al. |
| 8,873,813 | B2 | 10/2014 | Tadayon et al. |
| 9,590,933 | B2 * | 3/2017 | Huo .................... H04L 51/32 |
| 2005/0235219 | A1 | 10/2005 | Szeto |
| 2008/0024860 | A1 | 1/2008 | Yaroslaysky et al. |
| 2008/0059897 | A1 | 3/2008 | Dilorenzo |
| 2011/0173198 | A1 | 7/2011 | Malleshaiah et al. |
| 2012/0233303 | A1 | 9/2012 | Choi et al. |
| 2012/0331055 | A1 | 12/2012 | Cross et al. |
| 2013/0120598 | A1 | 5/2013 | Iwasaki |
| 2014/0009394 | A1 * | 1/2014 | Lee .................... H04N 5/4403 345/157 |
| 2014/0129627 | A1 | 5/2014 | Baldwin et al. |

OTHER PUBLICATIONS

"Tencent customer service—WeChat did not shake / shake songs / TV shake," accessed at http://kf.qq.com/info/69285.html , accessed on Feb. 13, 2017, pp. 1.
"The World's Shortest Personality Test," accessed at https://web.archive.org/web/20131028000739/http://www.blogthings.com/worldsshortestpersonalitytest, accessed on Feb. 10, 2017, pp. 2.
"Image-based personality test—completely free," 96 Pix, accessed at https://web.archive.org/web/20131112051948/http://96pix.com/, accessed on Feb. 10, 2017, p. 1.
"Personality Quiz.net," accessed at https://web.archive.org/web/20130704153945/http://www.personalityquiz.net/shapes/ullazang.htm, accessed on Feb. 10, 2017, pp. 1-9.
"Unfamiliar street—excellent dating tool strangers," accessed at https://web.archive.org/web/20120902013558/http://www.iostoy.com/2012/05/04/momo/, accessed on Feb. 10, 2017, pp. 4.
"WeChat—The new way to connect," accessed at https://web.archive.org/web/20131107155430/http://www.wechat.com/en/, accessed on Feb. 10, 2017, pp. 2.
"WeChat Features—Look Around," accessed at https://web.archive.org/web/20131113133112/http://www.wechat.com/en/features.html#around, accessed on Feb. 10, 2017, pp. 2.
"WeChat Features—Shake," accessed at https://web.archive.org/web/20131113133112/http://www.wechat.com/en/features.html#shake, accessed on Feb. 10, 2017, pp. 2.
Bian, L., and Holtzman, H., "Online Friend Recommendation through Personality Matching and Collaborative Filtering," The Fifth International Conference on Mobile Ubiquitous Computing, Systems, Services and Technologies, pp. 230-235 (Jan. 2011).
International Search Report and Written Opinion for counterpart International Patent Application No. PCT/CN2013/087105 dated Aug. 20, 2014, pp. 7.
Naruchitparames, J., et al., "Friend Recommendations in Social Networks using Genetic Algorithms and Network Topology," IEEE Congress on Evolutionary Computation (CEC), pp. 2207-2214 (2011).

Sawers, P., "TNW Pick of the Day: Vidyoo's video-chat app is like speed-dating for the Facebook generation," accessed at http://web.archive.org/web/20130829090125/http://thenextweb.com/apps/2012/08/10/vidyoo-this-video-chat-app-like-speed-dating-facebook-generation/, Posted on on Aug. 10, 2012, pp. 3.
Schapsis, C., "Location Based Social Networks, Location Based Social apps and games—Links," accessed at https://web.archive.org/web/20131004063149/http://bdnooz.com/lbsn-location-based-social-networking-links, accessed on Feb. 10, 2017, pp. 49.
"96 Fix," accessed at https://web.archive.org/web/20131011093032/http://96pix.com/, accessed on Sep. 15, 2014, p. 1.
"Lily Lily network mobile phone network," accessed at https://web.archive.org/web/20130714225827/http://shouji.baihe.com/, accessed on Sep. 15, 2014, pp. 1-3.
"Micro Letter How to use shake function? Select font Size : large small," accessed at http://kf.qq.com/info/69285.html , accessed on Sep. 15, 2014, pp. 1-2.
"Personality Quiz.net," accessed at http://web.archive.org/web/20130704153945/http://www.personalityquiz.net/shapes/ullazang.htm , accessed on Sep. 13, 2014, pp. 1-12.
"The World's Shortest Personality Test," accessed at https://web.archive.org/web/20131028000739/http://www.blogthings.com/worldsshortestpersonalitytest, accessed on on Sep. 15, 2014, pp. 1-2.
"WeChat Features—Drift Bottle," accessed at https://web.archive.org/web/20130919100400/http://wechat.com/en/features.html#bottle , accessed on Sep. 15, 2014, pp. 1-3.
"WeChat Features—Look Around," accessed at https://web.archive.org/web/20131113133112/http://www.wechat.com/en/features.html#around , accessed on Sep. 15, 2014, pp. 1-2.
"WeChat Features—Shake," accessed at https://web.archive.org/web/20131113133112/http://www.wechat.com/en/features.html#shake, accessed on Sep. 15, 2014, pp. 1-2.
Bian, L., and Holtzman, H., "Online Friend Recommendation through Personality Matching and Collaborative Filtering," The Fifth International Conference on Mobile Ubiquitous Computing, Systems, Services and Technologies, 2011, pp. 230-235.
International Search Report and Written Opinion for counterpart International Patent Application No. PCT/CN2013/087105 dated Aug. 20, 2014, 8 pages.
Iostoy, "Unfamiliar street—excellent dating tool strangers," accessed at https://web.archive.org/web/20120902013558/http://www.iostoy.com/2012/05/04/momo/, May 4, 2012, pp. 1-4.
Naruchitparames, J., et al., "Friend Recommendations in Social Networks using Genetic Algorithms and Network Topology," IEEE Congress on Evolutionary Computation (CEC), Jun. 5-8, 2011, pp. 2207-2214.
Sawers, P., "TNW Pick of the Day: Vidyoo's video-chat app is like speed-dating for the Facebook generation," accessed at http://web.archive.org/web/20130829090125/http://thenextweb.com/apps/2012//08/10/vidyoo-this-video-chat-app-like-speed-dating-facebook-generation/, accessed on Aug. 10, 2012, pp. 1-4.
Schapsis, C., "Cometogethr—Location Based Social Networks, Location Based Social apps and games—Links," accessed at https://web.archive.org/web/20131004063149/http://bdnooz.com/lbsn-location-based-social-networking-links, accessed on Sep. 15, 2014, pp. 1-40.
Schapsis, C., "Mywingman—Location Based Social Networks, Location Based Social apps and games—Links," accessed at https://web.archive.org/web/20131004063149/http://bdnooz.com/lbsn-location-based-social-networking-links, accessed on Sep. 15, 2014, pp. 1-40.

* cited by examiner

GENERATION OF A COMMUNICATION REQUEST BASED ON VISUAL SELECTION

CROSS-REFERENCE TO RELATED APPLICATIONS

This Application is a continuation under 35 U.S.C. § 120 of U.S. patent application Ser. No. 14/387,081 filed on Sep. 22, 2014, now U.S. Pat. No. 9,590,933, which is the U.S. National Stage filing under 35 U.S.C. § 371 of International Application No. PCT/CN2013/087105, filed on Nov. 14, 2013. International Application No. PCT/CN2013/087105 and U.S. patent application Ser. No. 14/387,081 are hereby incorporated by reference in their entireties.

BACKGROUND

Unless otherwise indicated herein, the materials described in this section are not prior art to the claims in this application and are not admitted to be prior art by inclusion in this section.

Devices may be configured to be in communication with each other through a network. To establish communication, a user of each device may send a communication request to another device on the network to request communication. A processor configured to be in communication with the network may facilitate communication between two or more users.

SUMMARY

In some examples, methods for generating a communication request are generally described. The methods may include retrieving an image from a memory. The methods may also include sending the image to a first device and a second device. The first device may be operated by a first user. The second device may be operated by a second user. The methods may also include receiving a first indication of a first selection region in the image from the first device. The methods may also include receiving a second indication of a second selection region in the image from the second device. The methods may also include analyzing the first and second selection regions. The methods may also include selecting the first user and the second user based on the analysis of the first and second selection region. The methods may also include generating the communication request to request communication between the first user and the second user based on the selection of the first user and the second user. The methods may also include sending the communication request to at least one of the first device or the second device.

In some examples, devices effective to generate a communication request are generally described. The devices may include a processor. The devices may also include a memory. The memory may be configured to be in communication with the processor. The processor may be effective to retrieve an image from a memory. The processor may also be effective to send the image to a first device and a second device. The first device may be operated by a first user. The second device may be operated by a second user. The processor may also be effective to receive a first indication of a first selection region in the image from the first device. The first selection region may relate to a first range of pixels. The processor may also be effective to receive a second indication of a second selection region in the image from the second device. The second selection region may relate to a second range of pixels. The processor may also be effective to analyze the first and second selection regions. The processor may also be effective to select the first user and the second user based on the analysis of the first and second selection region. The processor may also be effective to generate the communication request to request communication between the first device and the second device based on the selection of the first user and the second user. The processor may also be effective to send the communication request to at least one of the first device or the second device.

In some examples, systems effective to generate a communication request are generally described. The systems may include a processor. The systems may also include a memory. The memory may be configured to be in communication with the processor. The system may also include a first device. The first device may be operated by a first user. The first device may be configured to be in communication with the processor. The systems may also include a second device. The second device may be operated by a second user. The second device may be configured to be in communication with the processor. The processor may be effective to retrieve an image from a memory. The processor may also be effective to send the image to the first device and the second device. The processor may also be effective to receive a first indication of a first selection region in the image from the first device. The first selection region may relate to a first range of pixels. The processor may also be effective to receive a second indication of a second selection region in the image from the second device. The second selection region may relate to a second range of pixels. The processor may also be effective to analyze the first and second selection region. The processor may also be effective to select the first user and the second user based on the analysis of the first and second selection region. The processor may also be effective to generate the communication request to request communication between the first device and the second device based on the selection of the first user and the second user. The processor may also be effective to send the communication request to at least one of the first device or the second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
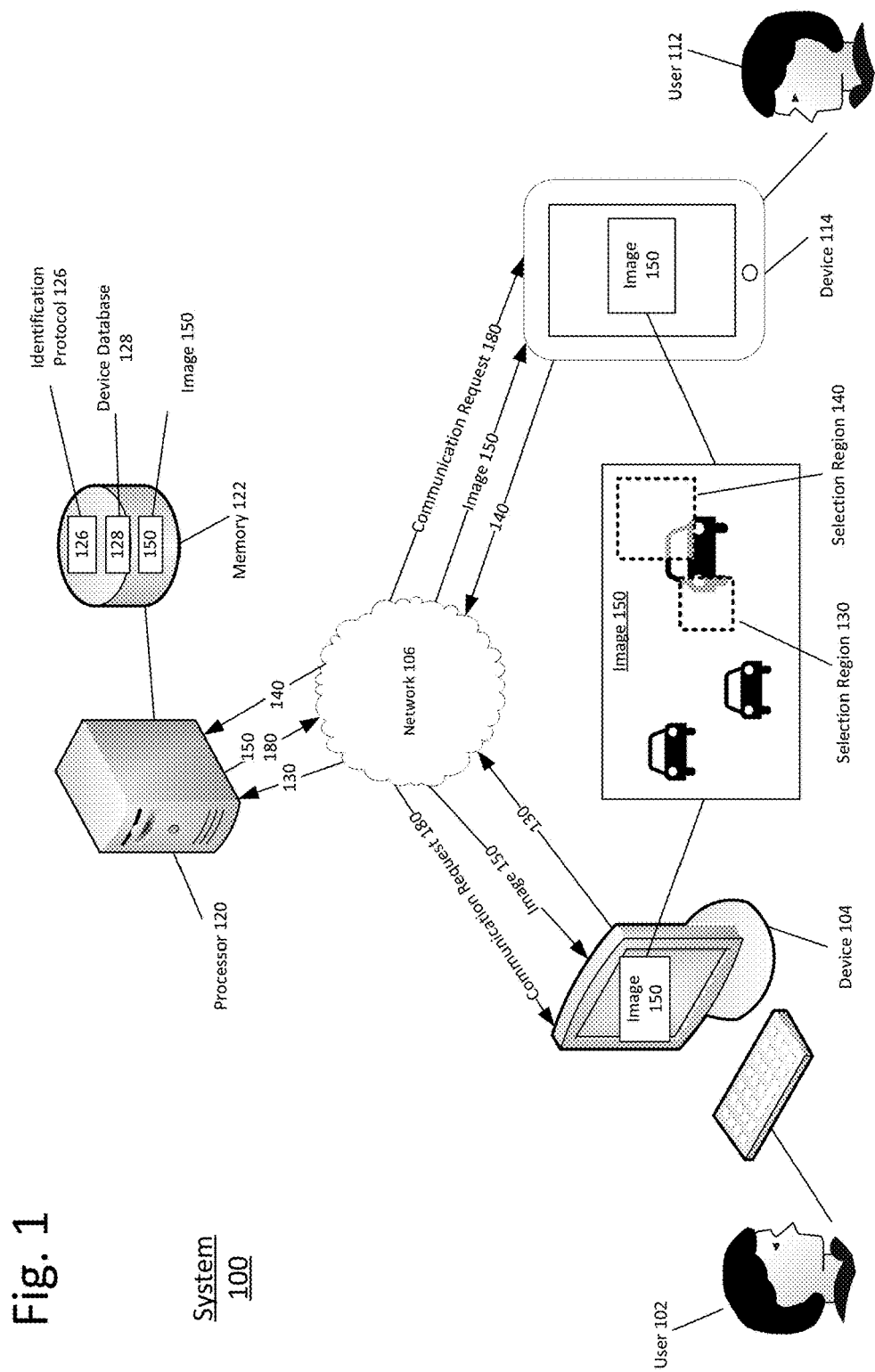
FIG. 1 illustrates an example system that can be utilized to implement generation of a communication request based on visual selection.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to generation of a communication request based on visual selection.

Briefly stated, technologies are generally described for generating a communication request. An example method may include retrieving an image from a memory. The method may also include sending the image to a first device operated by a first user and a second device operated by a second user. The method may also include receiving a first indication of a first selection region from the first device. The method may also include receiving a second indication of a second selection region from the second device. The method may also include analyzing the first and second selection regions. The method may also include selecting the first and second device based on the analysis. The method may also include generating the communication request to request communication between the first user and the second user. The method may also include sending the communication request to at least one of the first device or the second device.

FIG. 1 illustrates an example system 100 that can be utilized to implement generation of a communication request based on visual selection, arranged in accordance with at least some embodiments described herein. System 100 may include a processor 120, a memory 122, and/or at least two devices such as device 104 and device 114. Processor 120 may be configured to be in communication with memory 122. Processor 120 may be further configured to be in communication with at least two devices, such as device 104 and device 114, through a network 106. Network 106 may be the internet or a mobile communication network. Device 104 and/or device 114 may be devices such as a computer, a tablet, a laptop, a mobile phone, etc.

Processor 120 may be further configured to send an image 150 to one or more devices, such as device 104 and device 114, through network 106. Image 150 may assume a variety of forms such as objects, maps, characters, etc. Image 150 may include data that correspond to pixels on image 150. Memory 122 may include an identification protocol 126 and/or a device database 128. Identification protocol 126 may include instructions to analyze data received at processor 120 and/or to identify data in device database 128. Device database 128 may include data that corresponds to device 104, 114. Processor 120 may be further configured to store image 150 in memory 122.

A user 102 may view image 150 on a display of device 104 while operating device 104. A user 112 may view image 150 on a display of device 114 while operating device 114. User 102 and user 112 may respectively create selection regions 130, 140 using device 104 and/or device 114. For example, user 102 and user 112 may respectively create selection regions 130, 140, such as by pressing on a screen of a touch screen device, or using a user interface such as a computer mouse of a computer. Selection regions 130, 140 may correspond to respective ranges of pixels in image 150. Processor 120 may receive indications of selection regions 130, 140 from device 104 and device 114 through network 106. In some examples, selection regions 130, 140 may include common pixels. In some examples, selection region 130, 140 may include different pixels. Processor 120 may be further configured to execute instructions in identification protocol 126 to analyze selection regions 130, 140, and/or to identify data in device database 128 based on the analysis of selection regions 130, 140.

As discussed in more detail below, processor 120 may select two users, such as user 102 and user 112, based on profile data in device database 128 and/or based on analysis of selection regions 130, 140. Processor 120 may generate a communication request 180 based on the selection of user 102 and user 112 and may send communication request 180 to at least one of device 104 and/or device 114. In some examples, communication request 180 may include a request for user 102 and/or user 112 to communicate with each other.

Figure 2:
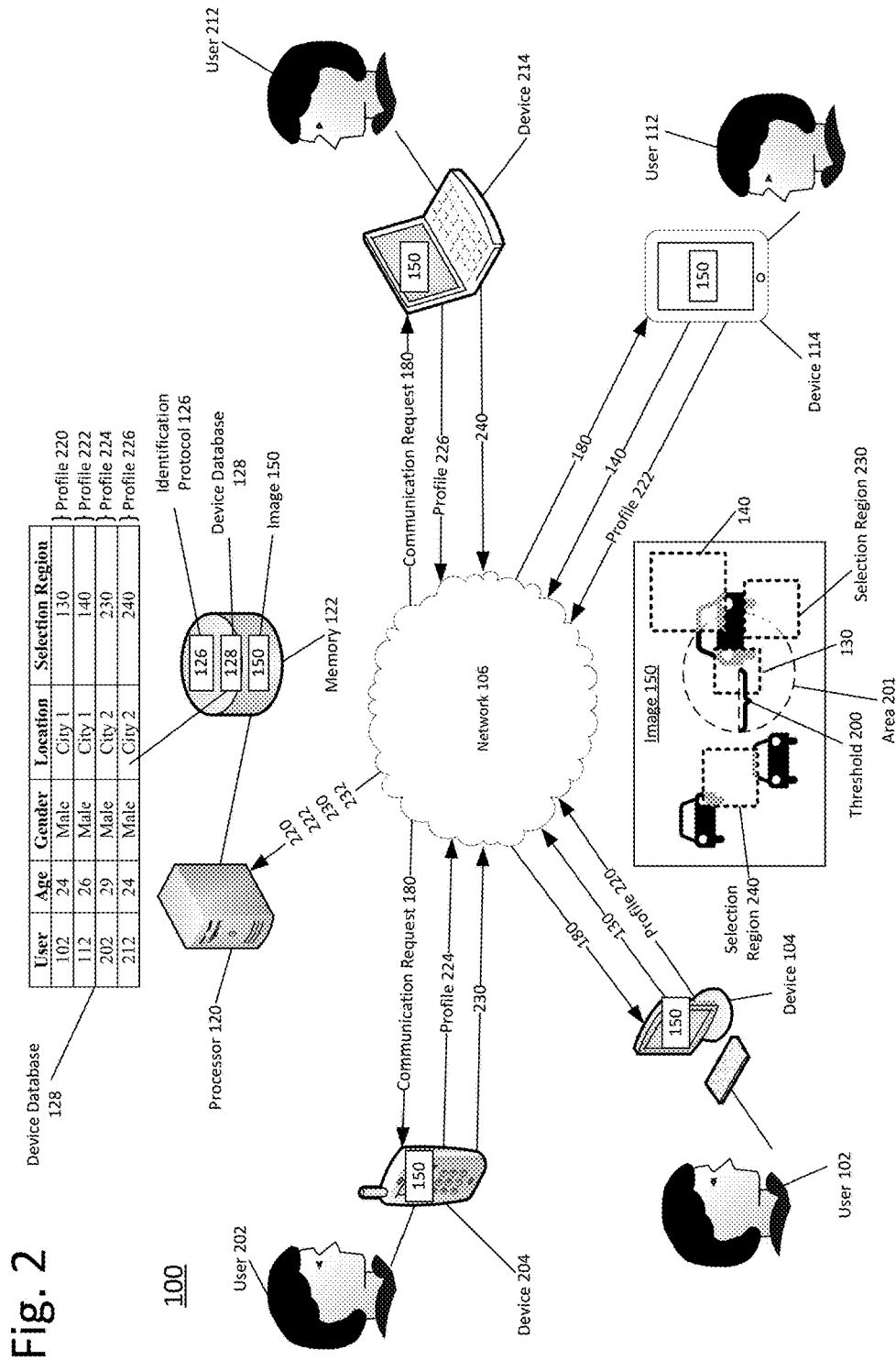
FIG. 2 illustrates the system of FIG. 1 with additional detail relating to device profiles.

FIG. 2 illustrates system 100 of FIG. 1 with additional detail relating to device profiles, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

System 100 may further include a device 204 and a device 214. Device 204 and/or device 214 may be devices such as a computer, a tablet, a laptop, a mobile phone, etc. A user 202 may create a selection region 230 using device 204. A user 212 may create a selection region 240 using device 214. Processor 120 may receive profiles 220, 222, 224, 226 of users 102, 112, 202, 212 through network 106 from devices 104, 114, 204, 214. Each profile 220, 222, 224, 226 may respectively include profile data such as time data, location data, gender data, and/or age data that respectively correspond to user 102, 112, 202, 212.

Time data may relate to a time in which selection regions 130, 140 are received at processor 120. In one example, selection regions received by processor 120 may be grouped by time intervals such as grouping selection regions received within a twenty four hour period. Location data may relate to respective locations of device 104 and device 114. In an example, profile 220 may include the profile data "Male", "Age 24", and "City 1". Profile 222 may include profile data "Male", "Age 26", and "City 1". Profile 224 may include profile data "Male", "Age 29", and "City 2". Profile 226 may include profile data "Male", "Age 24", and "City 2".

Processor 120 may populate device database 128 with profile data in profile 220, 222, 224, 226. For example, processor 120 may determine that profile 220 may relate to user 102, such as by analyzing login information input by user 102 on device 104, and may store profile data from profile 220 in a row that corresponds to user 102. Processor 120 may determine that profile 222 may relate to user 112 and may store profile data from profile 222 in a row that corresponds to user 212. Processor 120 may determine that profile 224 may relate to user 202 and may store profile data from profile 224 in a row that corresponds to user 202. Processor 120 may determine that profile 226 may relate to user 212 and may store profile data from profile 226 in a row that corresponds to user 212. Device database 128 may further include data that corresponds to selection regions 130, 140, 230, 240 received from each device 104, 114, 204, 214.

In an example, processor 120 may retrieve image 150 from memory 122 and send image 150 to devices 104, 114, 204, 214. Processor 120 may stop sending image 150 to a respective device in response to receiving a selection region from the respective device. Users 102, 112, 202, 212 may respectively create selection regions 130, 140, 230, 240 using device 104, 114, 204, 214. Device 104, 114, 204, 214 may respectively send indications of selection regions 130, 140, 230, 240 to processor 120 through network 106 and which may be received by processor 120. Selection regions 130, 140, 230, 240 may each include a respective range of pixels from image 150. In some examples, selection regions 130, 140, 230, 240 may include common pixels. In some examples, selection regions 130, 140, 230, 240 may include distinct pixels.

Processor 120 may execute instructions in identification protocol 126 to analyze selection regions 130, 140, 230, 240 to determine whether two or more regions have pixels within a threshold distance. For example, processor 120 may analyze selection regions 130, 140, 230, 240 to determine whether selection regions 130, 140, 230, 240 include pixels within a threshold distance from one another. The threshold distance may be analyzed by creating a shape with a size, such as a radius or diameter that corresponds to the threshold distance.

In one example, processor 120 may analyze a first selection region (of selection regions 130, 140, 230, 240) received prior to other selection regions. Processor 120 may compare the first selection region with other received selection regions and determine whether other selection regions include pixels within a threshold distance from the first selection region. Processor 120 may then select two users from among users 102, 112, 202, 212 based on the analysis. In some examples, processor 120 may receive profile data that corresponds to respective users. In one example, processor 120 may analyze the profile data, identify common profile data, and thereafter analyze selection regions from devices with common profile data. In another example, processor 120 may first identify two or more devices with corresponding selection regions that have pixels within a threshold distance, and then select two users to send communication requests based on the common profile data.

Identification protocol 126 may define and/or include a threshold 200. Threshold 200 may be a number that corresponds to a number of pixels, such as 100 pixels. Focusing on selection region 130, processor 120 may identify and/or evaluate an area 201 in image 150 around selection region 130. Area 201 may be of an arbitrary size and/or shape and may be defined by identification protocol 126. A size of area 201 may be based on threshold 200. For example, if area 201 is a circle, a radius of area 201 may be equivalent to threshold 200. In an example, processor 120 may identify a center of selection region 130 and analyze area 201 around that center.

In analyzing selection region 130, processor 120 may search for pixels of selection regions 140, 230, 240 in area 201. In an example where processor 120 identifies pixels of a particular one of selection regions 140, 230 or 240 in area 201, processor 120 may then select the users the correspond to selection region 130 and the particular selection region. In an example where processor 120 identifies an absence of pixels of selection regions 140, 230, 240 in area 201, processor 120 may not select selection region 130 and then analyze other selection regions. Processor 120 may continue to search for pixels of selection regions 130, 140, 230, 240 in area 201 until completion of execution of instructions in identification protocol 126 or until two users are selected.

In some examples, processor 120 may determine that three or more selection regions have pixels within a threshold distance. In these examples, where processor 120 determines that three or more selection regions overlap, processor 120 may decrease threshold 200 and then analyze the selection regions again. In some examples, processor 120 may analyze and rank corresponding profile data. In an example, processor 120 may rank data in device database 128 according to gender data first. Thereafter, processor 120 may rank data in device database 128 according to location data. Processor 120 may select user 102 and user 112 based on the ranking of profile data in device database 128 to generate and send communication request 180.

In an example, identification protocol 126 may include instructions to command processor 120 to first analyze gender data and then analyze location data. In an example, processor 120 may identify common profile data "Male" in profile 220, 222, 224 and may continue to analyze location data. Processor 120 may identify common profile data "City 1" in profile 220 and profile 222. Processor 120 may select user 102 and user 112 based on the identification of the common profile data "Male" and "City 1" and generate communication request 180.

In some examples, ranking of profile data in device database 128 may be performed by processor 120 prior to sending image 150 to device 104 and device 114. For example, processor 120 may receive and rank profile data 220, 222, 224, 226. Based on the ranking of the profile data, processor 120 may thereafter send image 150 to two or more devices and await receipt of selection regions 130, 140, 230, 240. In other examples, processor 120 may rank profile data after receipt of selection regions.

Figure 3:
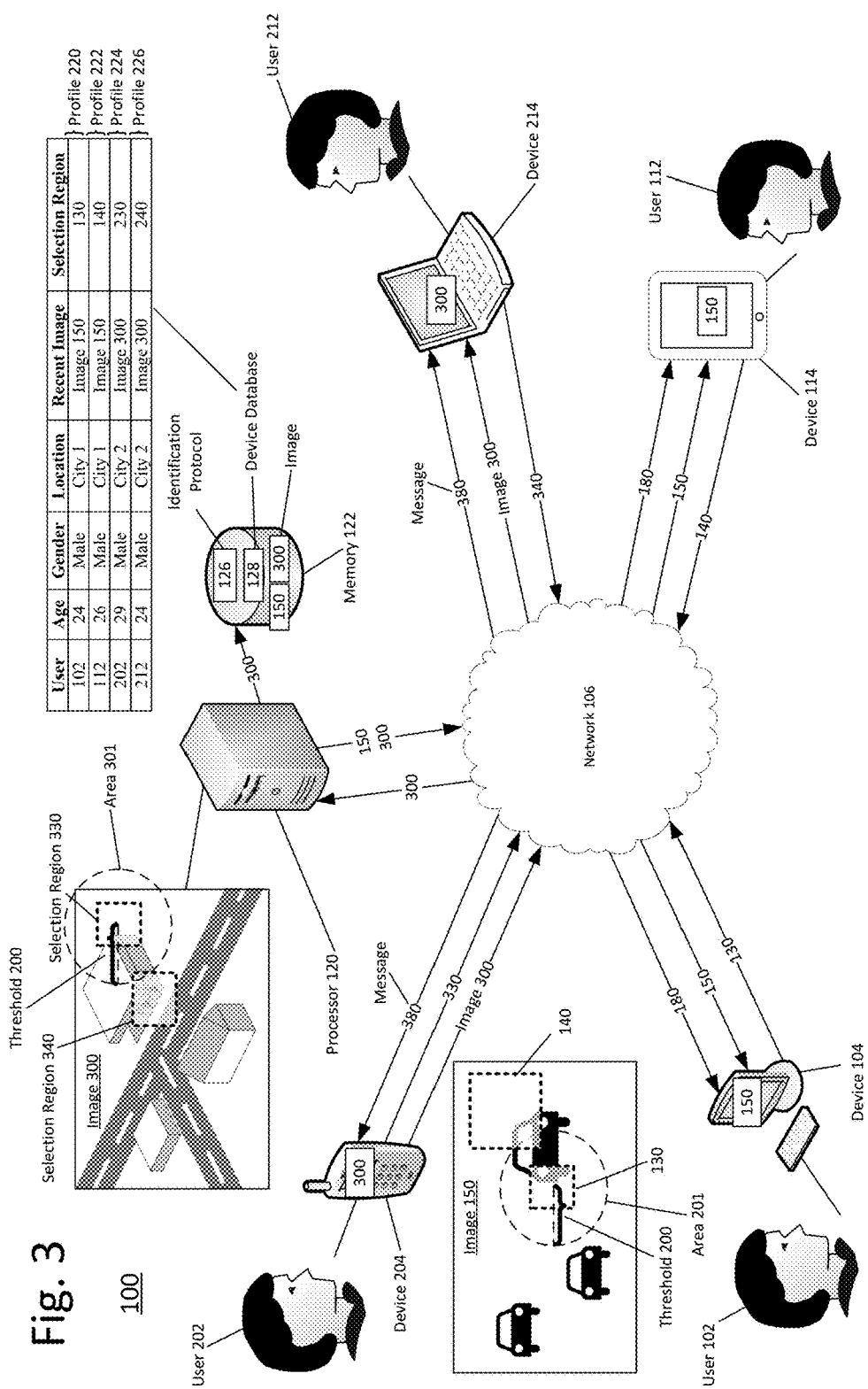
FIG. 3 illustrates an implementation of the system of FIG. 1 relating to an example where two or more images may be used.

FIG. 3 illustrates an implementation of system 100 of FIG. 1, relating to an example where two or more images may be used, arranged in accordance with at least some embodiments described here. FIG. 3 is substantially similar to system 100 of FIGS. 1 and 2, with additional details. Those components in FIG. 3 that are labeled identically to components of FIGS. 1 and 2 will not be described again for the purposes of clarity.

In an example, device 204 may be a device including a camera and may be configured to capture an image 300. User 202 may send image 300 to processor 120 using device 204. Processor 120 may receive image 300 from device 204 through network 106 and may store image 300 in memory 122. Identification protocol 126 may include instructions to command processor 120 to retrieve stored images 300 and to send images 300 to devices 204 and 214.

For example, processor 120 may first analyze gender data in profile data and then may analyze location data in profile data. Processor 120 may identify common profile data "Male" in profile 220, 222, 224, 226. Processor 120 may identify common profile data "City 1" in profile 220 and profile 222. Processor 120 may identify common profile data "City 2" in profile 224 and profile 226. Based on the common city profile data, processor 120 may send image 150 to device 104, 114 and may send image 300 to device 204, 214. Processor 120 may keep track of sent images in a "Recent Image" field of device database 128 in memory 122.

User 102, 112 may respectively create selection region 130, 140 from image 150 using device 104, 114. User 202, 212 may respectively create selection region 330, 340 from image 300 using device 204, 214. User 102, 112, 202, 212 may respectively send selection regions 130, 140, 330, 340 to processor 120 through network 106 using device 104, 114, 204, 214. Processor 120 may update profile data in device database 128 in response to sending image 150, 300 and/or in response to receiving selection regions 130, 140, 330, 340. Processor 120 may execute instructions in identification protocol 126 to analyze selection regions 130, 140, 330, 340 and generate communication requests 180, 380.

As discussed above, processor 120 may analyze selection regions 130, 140 in image 150. Similarly, processor may identify an area 301 in image 300 around selection region 330 based on threshold 200. Processor 120 may search for pixels of selection region 340 in area 201.

In some examples, each user may create more than one selection region in one or more images within a period of time. For example, user 102 may create selection region 130 in image 150 in a first instance of time. User 102 may receive image 300 approximately 30 minutes later and may create another selection region in image 300. Processor 120 may store each selection region created by each user at different times in device database 128. Users can thus create selection regions at different times.

In some examples, when more than two profiles include common profile data, processor 120 may generate communication request 180, 380 to include a list of users that correspond to the common profile data. For example, profile 220, 222, 224 corresponding to user 102, 112, 202 may include common profile data. Processor 120 may generate a communication request that includes users 112, 202 for user 102. Processor 120 may generate a communication request that includes users 102, 202 for user 112. Processor 120 may generate a communication request that includes users 102, 112 for user 202.

Among other possible benefits, a system in accordance with the disclosure may assist users of devices to establish communication and make friends among strangers. The system may benefit administrators and/or users in a social network. In an example, an administrator of a social network may provide a friend recommendation service. Users of the social network may receive friend recommendations on demand and in a relatively shorter amount of time. As communication may be initiated based on a common selection in an image, initial conversation between two users may be facilitated.

Figure 4:
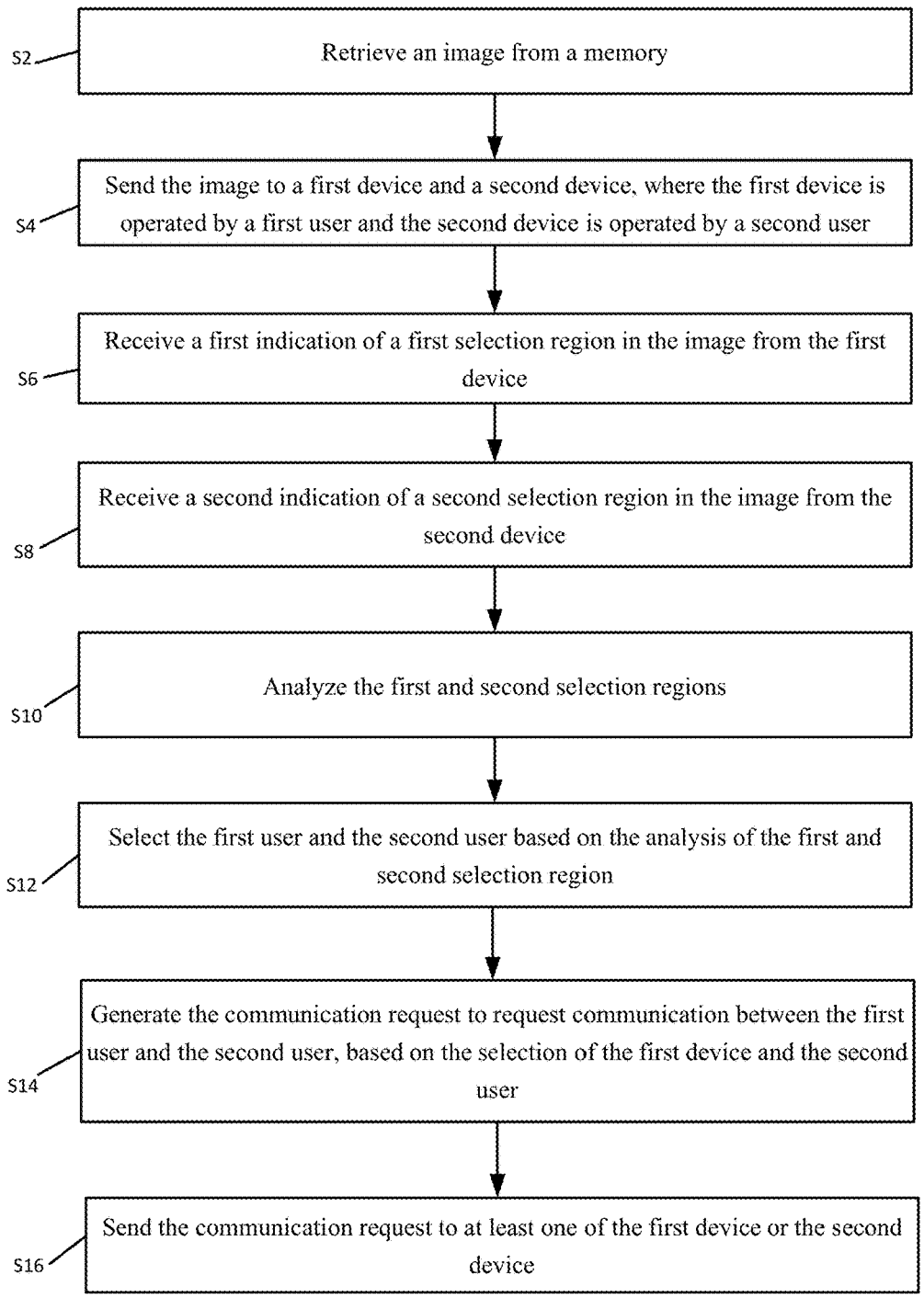
FIG. 4 illustrates a flow diagram for an example process for implementing generation of a communication request based on visual selection.

FIG. 4 illustrates a flow diagram for an example process for implementing generation of a communication request based on visual selection, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, S14 and/or S16. Although illustrated as discrete blocks, various blocks may be divided into additional blocks, combined into fewer blocks, or eliminated, depending on the desired implementation.

Processing may begin at block S2, "Retrieve an image from a memory." A processor may retrieve an image from a memory. The memory may be configured to be in communication with the processor. In some examples, prior to retrieving the image, the processor may receive the image from a first device.

Processing may continue from block S2 to S4, "Send the image to a first device and a second device, where the first device is operated by a first user and the second device is operated by a second user." The processor may send the image to the first device and a second device. The first device may be operated by a first user. The second device may be operated by a second user.

In some examples, prior to sending the image, the processor may receive a first profile from the first device. The first profile may include first profile data that corresponds to the first user. The processor may further receive a second profile from a second device. The second profile may include second profile data that corresponds to the second user. The processor may identify common profile data in the first and second profile. The identification of the first and second device may be based on the common profile data.

In some examples, prior to sending the image, the processor may receive the first profile from a first device. The processor may further receive the second profile from a second device. The processor may further receive a third profile from a third device. The third profile may include third profile data that corresponds to the third user. The processor may rank the first profile data, the second profile data, and the third profile data. The processor may identify the first and second device based on the ranking of the first, second, and third profile data. The ranking may be based on time data, location data, gender data, and/or age data. Time data may relate to a time in which the first, second, and third selection regions are received by the processor. Location data may relate to respective locations of the first, second, and third device.

Processing may continue from block S4 to S6, "Receive a first indication of a first selection region in the image from the first device." The processor may receive a first indication of a first selection region in the image from the first device. The first selection region may relate to a first range of pixels.

Processing may continue from block S6 to S8, "Receive a second indication of a second selection region in the image from the second device." The processor may further receive a second indication of a second selection region in the image from the second device. The second selection region may relate to a second range of pixels.

Processing may continue from block S8 to S10, "Analyze the first and second selection regions." The processor may analyze the first and second selection region. The processor may evaluate an area of the image. The size of the area may be based on a threshold value.

Processing may continue from block S10 to S12, "Select the first user and the second user based on the analysis of the first and second selection region." The processor may select the first and second user based on the analysis of the first and second selection region.

In some examples, prior to selecting the first and second user, the processor may receive the first profile from a first device. The processor may further receive the second profile from a second device. The processor may identify common profile data in the first and second profile. The selection of the first and second user may be based on the common profile data.

In some examples, prior to selecting the first and second user, the processor may send the image to a third device. The third device may be operated by a third user. The processor may receive a third indication a third selection region in the image from the third device. The processor may further analyze the third selection region. The processor may receive the first profile from a first device. The processor may further receive the second profile from a second device. The processor may further receive a third profile from a third device. The third profile may include third profile data that corresponds to the third user. The processor may rank the first profile data, the second profile data, and the third profile data. The processor may select the first and second user based on the ranking of the first, second, and third profile data.

Processing may continue from block S12 to S14, "Generate the communication request to request communication between the first user and the second user, based on the selection of the first device and the second user." The processor may generate a communication request to request communication between the first user and the second user. Generation of the communication request may be based on the selection of the first and second user.

Processing may continue from block S14 to S16, "Send the communication request to at least one of the first device or the second device." The processor may send the communication request to the first and second device.

Figure 5:
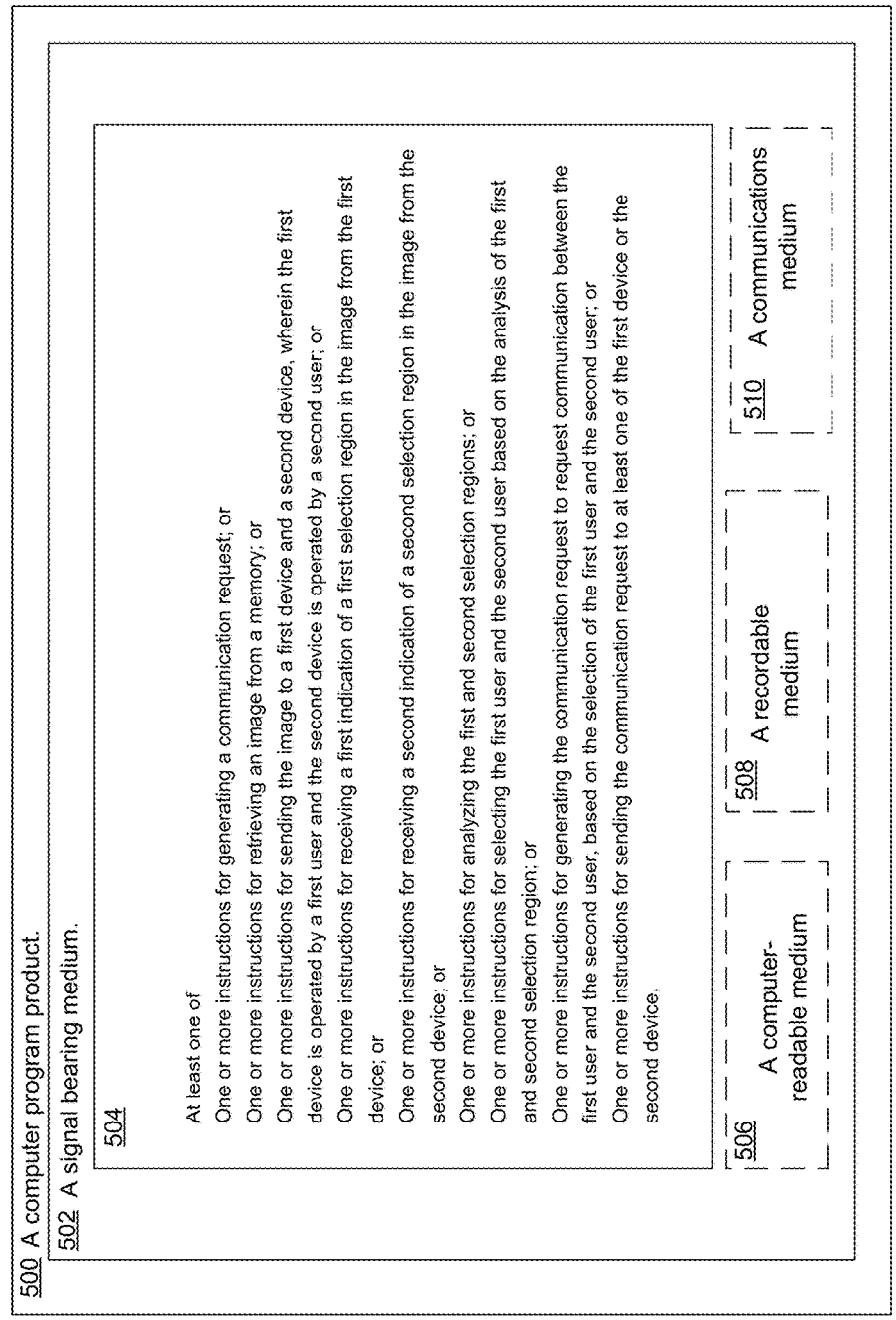
FIG. 5 illustrates an example computer program product that can be utilized to implement generation of communication request based on visual selection.

FIG. 5 illustrates an example computer program product 500 that can be utilized to implement generation of a communication request based on visual selection, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 120 may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
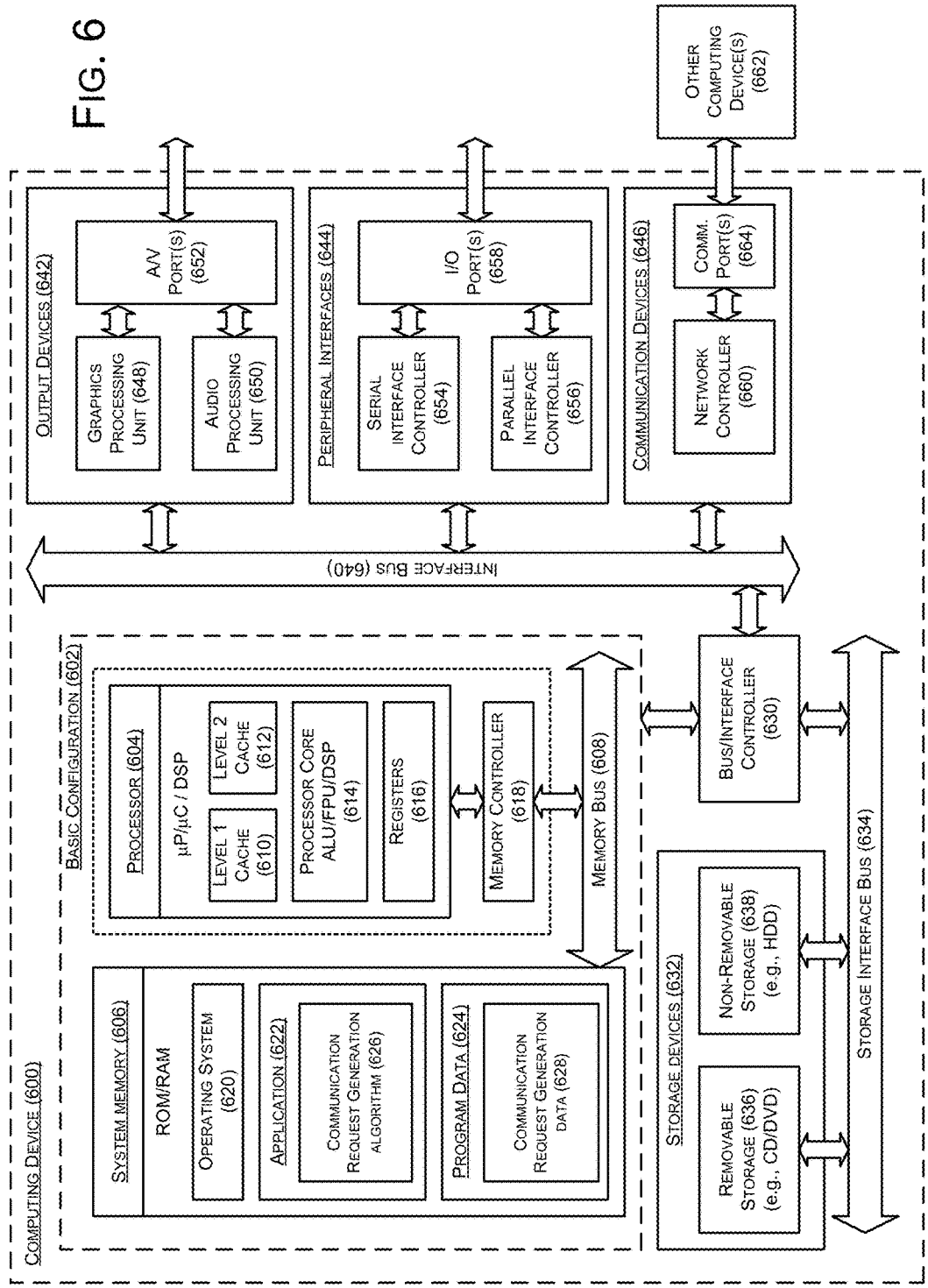
FIG. 6 is a block diagram illustrating an example computing device that is arranged to implement generation of communication request based on visual selection, all arranged according to at least some embodiments described herein.

FIG. 6 is a block diagram illustrating an example computing device 600 that is arranged to implement generation of a communication request based on visual selection, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor ($\mu$P), a microcontroller ($\mu$C), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a communication request generation algorithm 626 that is arranged to perform the functions as described herein including those described with respect to system 100 of FIGS. 1-5. Program data 624 may include communication request generation data 628 that may be useful for implementation of generation of a communication request based on visual selection as is described herein. In some embodiments, application 622 may be arranged to operate with program data 624 on operating system 620 such that generation of a communication request based on visual selection may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 736 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more PO ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a communication request, the method comprising, by a processor:
   receiving an image from a first device operated by a first user;
   receiving a first indication of a first selection region in the image from the first device;
   identifying an area of the image based on the first selection region;
   sending the image to a second device operated by a second user;
   receiving a second indication of a second selection region in the image from the second device;
   analyzing the area of the image to determine that at least a portion of the second selection region is within the area of the image;
   selecting the first user and the second user based on the analysis of the area;
   generating the communication request based on the selection of the first user and the second user, wherein the communication request includes a request for at least one of the first user or the second user to communicate with each other; and
   sending the communication request to at least one of the first device or the second device, wherein sending the communication request to at least one of the first device or the second device facilitates increasing recommendations for at least one of the first user or the second user in a social media platform, and further facilitates establishing communication between the first user and the second user in the social media platform.

2. The method of claim 1, wherein analyzing the area of the image includes:
   identifying a range of pixels of the second selection region; and
   searching for a portion of the range of pixels in the area of the image.

3. The method of claim 2, wherein selecting the first user and the second user includes selecting the first user and the second user in response to a presence of the portion of the range of pixels in the area of the image.

4. The method of claim 2, wherein the range of pixels is a first range of pixels, and the method further comprising:
   receiving a third indication of a third selection region in the image from a third device operated by a third user;
   identifying a second range of pixels of the third selection region; and
   searching for a portion of the second range of pixels in the area of the image.

5. The method of claim 4, further comprising, in response to a presence of the portion of the second range of pixels in the area of the image:
   receiving, from the first device, first profile data that relates to the first user;
   receiving, from the second device, second profile data that relates to the second user;
   receiving, from the third device, third profile data that relates to the third user; and
   ranking the first profile data, the second profile data, and the third profile data, wherein selecting the first user and the second user is further based on the ranking of the first, second, and third profile data.

6. The method of claim 4, further comprising:
   in response to a presence of the portion of the first range of pixels and a presence of the portion of the second range of pixels in the area of the image, determining a number of selection regions that overlaps with the area of the image;
   determining that the number of selection regions is greater than a particular value; and
   in response to the determination that the number of selection regions being greater than the particular value, decreasing a value of a threshold, wherein the value of the threshold corresponds to a size of the area.

7. The method of claim 6, further comprising, in response to decreasing the value of the threshold, analyzing the area, the second selection region, and the third selection region.

8. The method of claim 2, further comprising in response to the portion of the second selection region being outside of the area of the image, increasing a value of a threshold, wherein the value of the threshold corresponds to a size of the area.

9. The method of claim 1, further comprising:
   in response to a determination that the portion of the second selection region is outside of the area of the image, receiving a third indication of a third selection region in the image from a third device operated by a third user; and
   analyzing the area of the image to determine that at least a portion of the third selection region is within the area of the image.

10. A system effective to generate a communication request, the system comprising:
    a processor;
    a memory configured to be in communication with the processor;
    a first device operated by a first user, wherein the first device is configured to be in communication with the processor; and
    a second device operated by a second user, wherein the second device is configured to be in communication with the processor;
    wherein the processor is configured to:
      receive an image from the first device;
      receive a first indication of a first selection region in the image from the first device;
      identify an area of the image based on the first selection region;
      send the image to the second device;
      receive a second indication of a second selection region in the image from the second device;
      analyze the area of the image to determine that at least a portion of the second selection region is within the area;
      select the first user and the second user based on the analysis of the area;

generate the communication request based on the selection of the first user and the second user, wherein the communication request includes a request for at least one of the first user or the second user to communicate with each other; and send the communication request to at least one of the first device or the second device, wherein the communication request sent to at least one of the first device or the second device facilitates increase in recommendations for at least one of the first user or the second user in a social media platform, and further facilitates to establish communication between the first user and the second user in the social media platform.

11. The system of claim 10, wherein the processor is further configured to:

identify a first range of pixels of the second selection region; and search for a portion of the first range of pixels in the area of the image.

12. The system of claim 11, wherein the processor is further configured to:

select the first user and the second user in response to a presence of the portion of the first range of pixels in the area of the image.

13. The system of claim 11, wherein the processor is further configured to:

receive a third indication of a third selection region in the image from a third device operated by a third user;

identify a second range of pixels of the third selection region;

search for a portion of the second range of pixels in the area of the image;

receive, from the first device, first profile data that relates to the first user;

receive, from the second device, second profile data that relates to the second user;

receive, from the third device, third profile data that relates to the third user; and rank the first profile data, the second profile data, and the third profile data, wherein selection of the first user and the second user is further based on the ranking of the first, second, and third profile data.

14. The system of claim 13, wherein the processor is further configured to:

in response to a presence of the portion of the first range of pixels and a presence of the portion of the second range of pixels in the area of the image, determine a number of selection regions that overlaps with the area of the image;

determine that the number of selection regions is greater than a particular value; and in response to the determination that the number of selection regions is greater than the particular value, decrease a value of a threshold, wherein the value of the threshold corresponds to a size of the area.

15. The system of claim 10, wherein the processor is further configured to:

in response to a determination that the portion of the second selection region is outside of the area, increase a value of a threshold, wherein the value of the threshold corresponds to a size of the area.

16. A system effective to generate a communication request from a first device to a second device, the system comprising:

a memory configured to store:
an image;
first profile data that relates to a first user;
second profile data that relates to a second user; and
third profile data that relates to a third user; and a processor configured to be in communication with the memory, wherein the processor is configured to:
retrieve the image from the memory;
send the image to the first device operated by the first user;
receive a first indication of a first selection region in the image from the first device;
identify an area of the image based on the first selection region;
send the image to the second device operated by the second user;
receive a second indication of a second selection region in the image from the second device;
send the image to a third device operated by the third user;
receive a third indication of a third selection region in the image from the third device;
analyze the area to determine that at least a portion of the second selection region is within the area;
analyze the area to determine that at least a portion of the third selection region is within the area;
rank the first profile data, the second profile data, and the third profile data based on the analysis of the area;
select the second user based on the analysis of the rank of the first profile data, the second profile data, and the third profile data;
generate the communication request based on the selection of the second user, wherein the communication request corresponds to a recommendation for the first user to communicate with the second user; and
send the communication request to the second device, wherein the communication request sent to the second device facilitates increase in recommendations for the first user to communicate with the second user in a social media platform, and further facilitates to establish a communication between the first user and the second user in the social media platform.

17. The system of claim 16, wherein the processor is further configured to:

identify a first range of pixels of the second selection region;

identify a second range of pixels of the third selection region;

search for a portion of the first range of pixels in the area of the image; and search for a portion of the second range of pixels in the area of the image.

18. The system of claim 17, wherein the processor is further configured to rank the first profile data, the second profile data, and the third profile data in response to a presence of the portion of the first range of pixels and a presence of the portion of the second range of pixels, in the area of the image.

19. The system of claim 17, wherein the processor is further configured to:

in response to a presence of the portion of the first range of pixels and a presence of the portion of the second range of pixels in the area of the image, determine a number of selection regions that overlaps with the area of the image;

determine that the number of selection regions is greater than a particular value; and in response to the determination that the number of selection regions is greater than the particular value, decrease a value of a threshold, wherein the value of the threshold corresponds to a size of the area.

20. The system of claim 16, wherein the processor is further configured to:
    determine that the portion of the second selection region is outside of the area;
    determine that the portion of the third selection region is outside of the area; and
    in response to the determination that the portions of the second and third selection areas are outside of the area, increase a value of a threshold that corresponds to a size of the area.

* * * * *